Nov. 10, 1931.  J. L. DRAKE  1,831,060
PROCESS OF ROLLING SHEET GLASS
Filed July 14, 1928
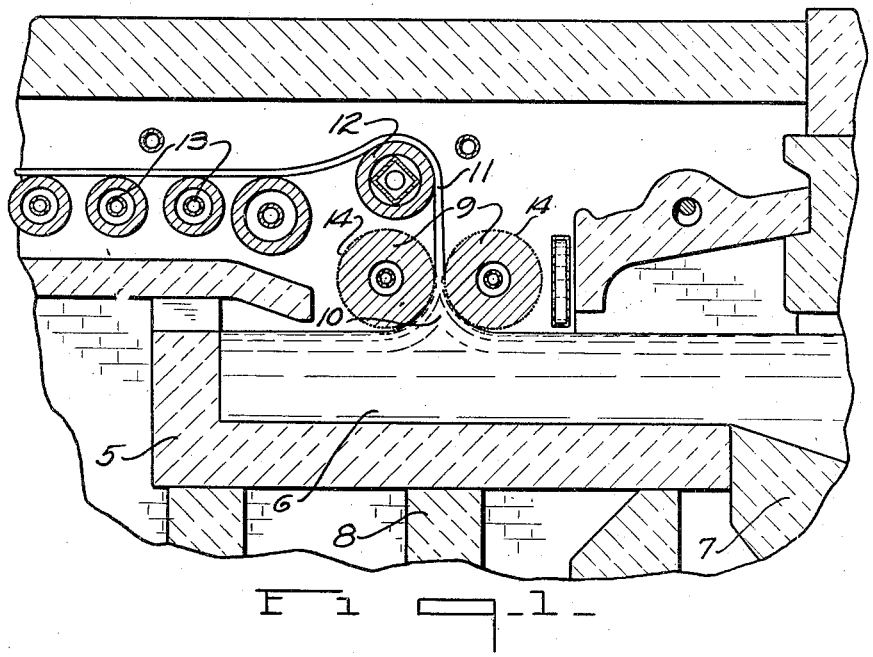
Fig. 1.
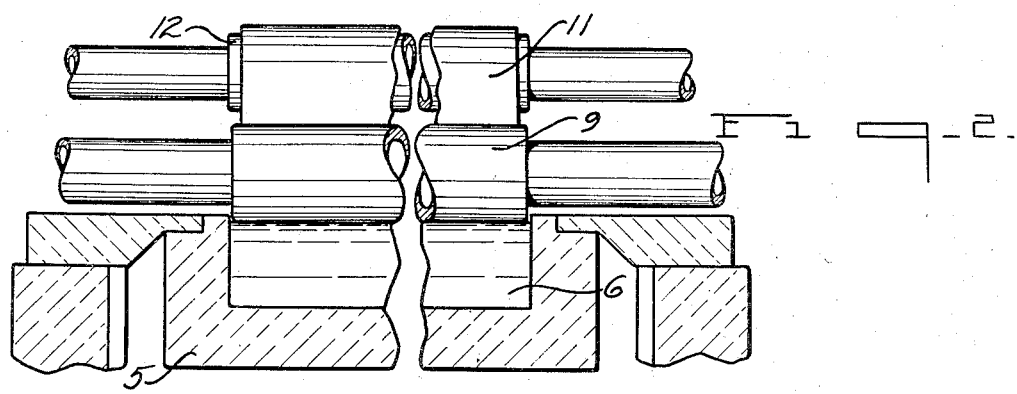
Fig. 2.
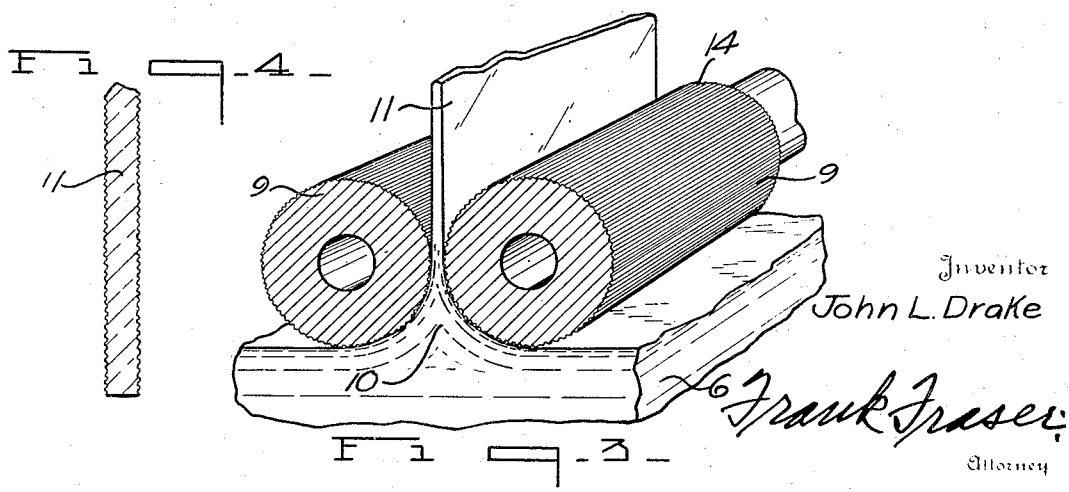
Fig. 4.
Fig. 3.
Inventor
John L. Drake
Frank Fraser
Attorney Patented Nov. 10, 1931

1,831,060

UNITED STATES PATENT OFFICE

JOHN L. DRAKE, OF TOLEDO, OHIO, ASSIGNOR TO LIBBEY-OWENS-FORD GLASS COMPANY, OF TOLEDO, OHIO, A CORPORATION OF OHIO

PROCESS OF ROLLING SHEET GLASS

Application filed July 14, 1928. Serial No. 292,830.

The present invention relates to a novel process and apparatus for producing sheet glass.

An important object of the invention is to provide for use in sheet glass apparatus, an improved type of roll, said roll being provided with longitudinal serrations or ribs.

Another object of the invention is to provide in sheet glass apparatus, sheet rolling means including a roll designed to grip the sheet being formed and to form slight ridges or serrations on the sheet extending laterally thereof.

A further object of the invention is to provide a novel process for producing sheet glass wherein molten glass is supplied to a forehearth having an exposed drawing bay and in maintaining the level of the glass therein, and the lower portions of the peripheries of a pair of longitudinally ribbed rolls situated thereabove in such relationship, and in rotating said rolls in such a way that the molten glass is drawn upwardly therebetween and reduced to sheet form.

Other objects and advantages of the invention will become more apparent during the course of the following description when taken in connection with the accompanying drawings.

In the drawings wherein like numerals are employed to designate like parts throughout the same, Fig. 1 is a fragmentary vertical longitudinal section through a form of sheet glass apparatus illustrating my improved roll in use, Fig. 2 is a fragmentary vertical transverse section therethrough, Fig. 3 is a fragmentary perspective view, partially in section, illustrating a pair of my improved rolls, and Fig. 4 is a fragmentary sectional view illustrating a sheet of glass formed by the use of my improved rolls.

The present invention relates more particularly to that type of glass apparatus wherein a pair of rotatable rolls are arranged to create a sheet forming pass through which molten glass is passed and formed into a sheet of substantially predetermined and uniform thickness.

Heretofore, it has been customary to form or size such rolls on a lathe, the rolls being rotated about their longitudinal axis while a cutting tool is moved longitudinally of the roll to reduce said roll to its proper size. Although the cutting tool used to shape the roll does not leave a relatively deep groove therein, nevertheless there are slight grooves extending around the periphery of the roll and extending from one end of the roll to the other much in the nature of a thread on a screw. As above stated, these ridges and grooves thus formed are not particularly pronounced, yet when placed in contact with molten glass they have an effect thereon, tending to create slight waves extending longitudinally of the sheet.

Referring to Fig. 1, the numeral 5 designates a draw-pot or working receptacle adapted to contain a source of molten glass 6 supplied from a continuous tank furnace or the like 7. The working receptacle 5 may be supported upon pot stools 8 arranged in a suitable chamber designed to properly control the temperature of the molten glass.

Positioned above the mass of molten glass is a pair of rolls 9 arranged to create a sheet forming pass through which the upwardly moving glass 10 is passed and reduced to a sheet 11 of substantially predetermined and uniform thickness. In the particular type of apparatus shown, the sheet is deflected over a roll 12 so that it may be passed in a horizontal plane over a series of rolls 13 which carry the sheet forward into an annealing leer as will be readily understood.

This invention is not limited to any particular type of sheet forming mechanism or process of handling the glass, but on the other hand relates to the character of the rolls 9. As stated above, ordinarily the rolls are grooved circumferentially. Although the ridges and grooves are not purposely formed, they nevertheless have a bearing on the character of sheet produced.

In accordance with the present invention, the rolls are purposely formed with serrations or ribs 14, extending longitudinally of the said rolls. This is clearly shown in Fig. 3. For the purposes of illustration, the serrations are exaggerated, as in actual practice it is preferred that they be rather minute, although their size can be varied one way or another. To produce a roll in this way, the roll may be suitably mounted in a machine and a cutting tool moved longitudinally of the roll instead of the roll rotating in contact with a cutting tool. In forming the rolls with the serrations 14, it will be seen that the pair of rolls arranged to create a sheet forming pass will nip or grip the sheet in a manner to positively feed the same forward. In gripping the glass in this manner, a more uniform sheet will result, and slippage between the rolls and the glass will be practically eliminated. In Fig. 4, in an exaggerated manner, a section of a sheet of glass is illustrated. The slight ridges formed in the sheet are far from objectionable and are readily removed during the grinding of the sheet during the manufacture of plate glass.

If the lower peripheries of the rolls are mounted in close proximity to the surface of the molten glass as illustrated, the rolls will tend to positively advance the molten glass to the sheet forming pass so that at all times a sufficient quantity of glass will be passed through the sheet forming pass to form a sheet of uniform and predetermined thickness.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. The process of producing sheet glass, which consists in flowing molten glass from a tank furnace into a forehearth having an exposed drawing bay, maintaining the glass in the drawing bay at such a level that it contacts with the lower portions of the peripheries of a pair of longitudinally ribbed rolls situated thereabove, and rotating said rolls in such a way that the glass is drawn upwardly therebetween and reduced to sheet form.

2. The process of producing sheet glass, which consists in flowing molten glass from a tank furnace into a forehearth having an exposed drawing bay, maintaining the level of the glass in the drawing bay and the lower portions of the peripheries of a pair of longitudinally ribbed rolls situated thereabove in such relationship, and in rotating said rolls in such a way that the molten glass will be positively advanced to the sheet forming pass created between said rolls and there reduced to sheet form.

Signed at Toledo, in the county of Lucas and State of Ohio, this 25th day of June, 1928.

JOHN L. DRAKE.